July 7, 1970  G. KAESS  3,519,342
RANGE FINDER FOCUSING DEVICE
Filed May 8, 1968
4 Sheets-Sheet 1
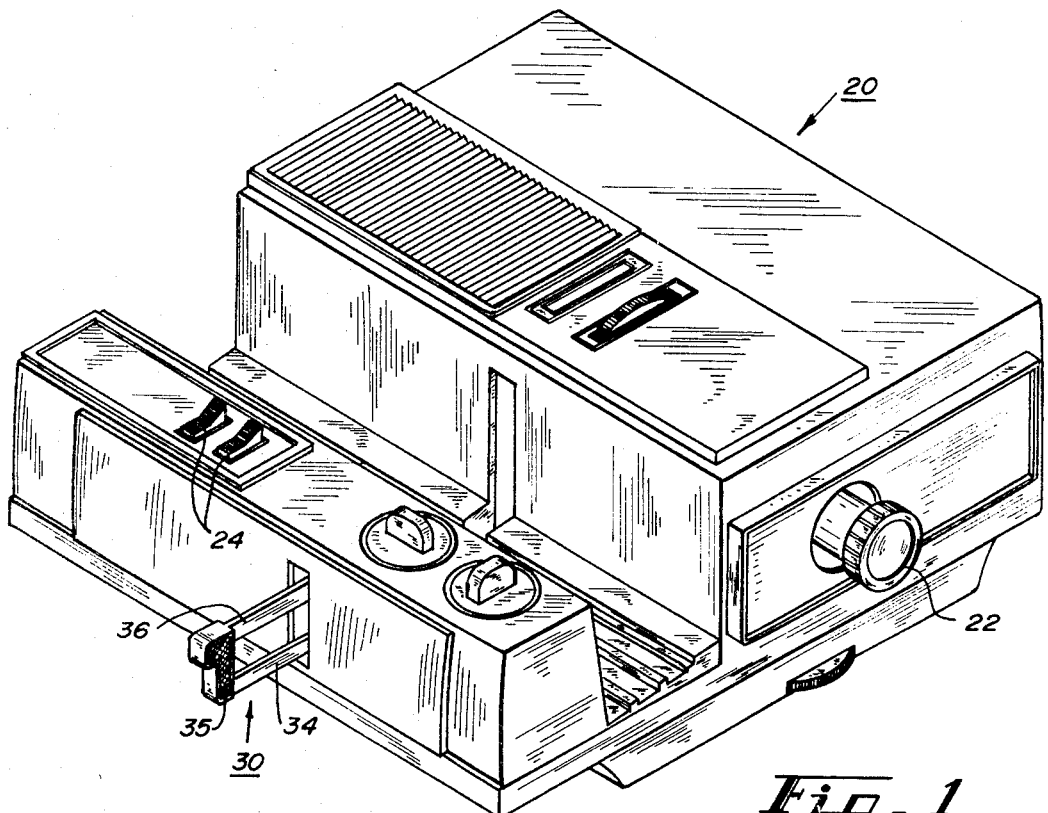
Fig_1
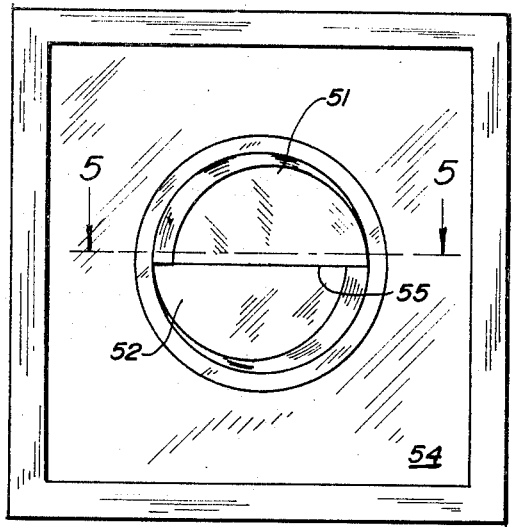
Fig_6
Fig_5
INVENTOR.
GARY KAESS
BY
Ralph R Roberts
AGENT.

July 7, 1970  G. KAESS  3,519,342
RANGE FINDER FOCUSING DEVICE
Filed May 8, 1968  4 Sheets-Sheet 2

INVENTOR.
GARY KAESS
BY
Ralph R. Roberts
AGENT.

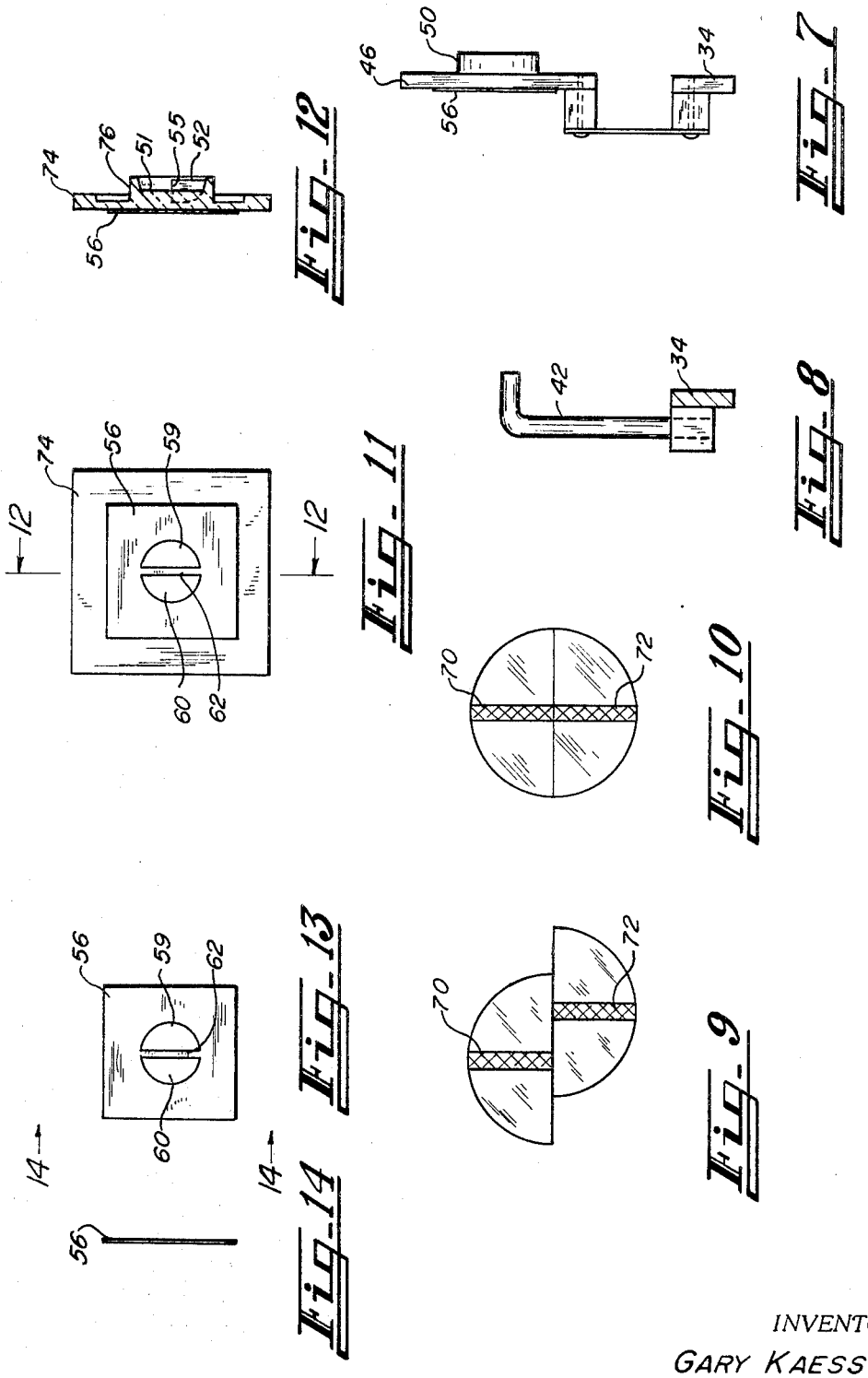

July 7, 1970    G. KAESS    3,519,342
RANGE FINDER FOCUSING DEVICE

Filed May 8, 1968    4 Sheets-Sheet 4

INVENTOR.
GARY KAESS

BY
*Ralph R. Roberts*
AGENT.

United States Patent Office 3,519,342
Patented July 7, 1970

3,519,342
RANGE FINDER FOCUSING DEVICE
Gary Kaess, Fair Lawn, N.J., assignor to Atlas-Rand Corporation, Paramus, N.J., a corporation of New Jersey
Filed May 8, 1968, Ser. No. 727,466
Int. Cl. G03b 21/14
U.S. Cl. 353—97                            15 Claims

ABSTRACT OF THE DISCLOSURE

A range finder focusing device for automatic slide projectors in which a pair of prisms is formed as part of one surface of an optical light-conducting member. The sloped surfaces of the prisms are oppositely inclined at like angles with the midsurfaces of the prisms passing through an imaginary line. The opposite side of the conducting member is formed as a plane which is generally parallel to this imaginary line. A metal mask having oppositely disposed D-shaped openings is attached to or lies in the plane surface and includes a bar portion between the D-shaped openings. This bar portion upon the viewing surface becomes a focusing indicator in the manner of a split image when the range finder focusing device is placed in an illuminated optical path.

BACKGROUND OF THE INVENTION

Field of the invention

The field of art to which this invention pertains is found in the class of optics and more particularly in the subclasses of "Projecting Apparatus" and "Magic Lanterns." Art relative thereto may be found in the class of Photography and the subclass of "Focusing."

DESCRIPTION OF THE PRIOR ART

Many aids for precise focusing of slide projectors have been proposed, and in certain instances these aids have provided a focusing means allowing the operator to determine a satisfactory resolution of the optical system of the projector. In general, however, the user or operator has focused the projector by viewing a slide moved into the illuminated optical path of the projector and by manipulating the position of the objective lens in the optical system has brought the scene represented in the particular slide into a reasonably clear focus as seen on a viewing screen. This focusing method is the common method employed and prior to this invention has been considered more or less satisfactory for all slide projectors.

With the advent of automatic focusing in slide projectors this method has become less effective and satisfactory. The automatic focusing devices usually employed in projectors usually "reads" and adjusts the objective lens system in response to light reflected from only the center portion of the slide. After an initial focusing of the projector and when the projected image of subsequent slides on the screen appears to be out of focus, the projector operator often is confused or uncertain as to whether the projector has moved out of focus or whether the view in the slide is, in and of itself, out of focus. When this out-of-focus condition occurs, the operator often starts to adjust the objective lens, often with undesirable results. The operator, in the use of a range finder focusing device such as is disclosed in the present invention, provides means whereby the focus condition of the projector may be instantly and accurately checked and, if necessary, corrected.

The known conventional slides which, prior to this invention, have been used to check the focusing condition of the projector includes slides having circle patterns similar to the test patterns used to adjust the focus of a television receiver. Other focusing slides are known and have geometric patterns wherein the adjacent pattern portions are designed with contrasts tending to accentuate the distortions occurring because of improper focusing. The use of such slides produces focusing adjustments wherein the focusing is actually relative. Repeated tests of adjustment procedures using the same slide usually produce focus settings wherein the focus varies as much as two or three percent. This inaccuracy in focusing is hard to determine by viewing the target slide, whereas in the viewing of a distant scene of a landscape slide and the like, the out-of-focus background becomes indistinct or blurred.

SUMMARY OF THE INVENTION

The range finder focusing device of this invention is for use in automatic focusing slide projectors and contemplates the providing of a slide or like optical transmitting device which has a planar surface upon which is mounted a mask member having a pair of oppositely disposed D-shaped apertures. Between these D-shaped apertures there is provided a bar portion of the mask which, when moved into and projected by a focused and illuminated optical path, is viewed upon the screen as a determined bar appearing as a wide black line. Opposite this bar portion, there is provided in the device a pair of adjacent prism members having its sloped surface disposed in opposite directions so as to provide diverging optical paths. When the range finder focusing device is brought in way of the illuminated optical path, the prisms cause the projected image of that bar portion which is opposite a prism portion to be deflected. When the bar portions of the mask are moved into the precise focal point relative to the condensing and objective lens arrangement of the projector and screen, the bar portions coincide or are aligned in the manner of a split image. In practice, the objective lens is moved to bring the optical system into a focusing condition wherein the projected image of the bar portions are brought into a precise alignment to visually indicate to the operator of the projector that the system is in an exact focus condition.

In one embodiment of this invention, the range finder focusing device is attached to a slide changer or pusher apparatus and is movable therewith. The device is precisely disposed on this pusher apparatus so that when moved into the optical axis the planar surface is in the same plane as are the slides moved thereto by the changer. The image appearing on the screen is seen as bar portions which are moved toward and from coincidence by moving the objective lens. At coincidence or alignment of the bar portions the optical system is at focus for the maximum picture sharpness. In and out-of-focus condition the halves of the image produced by the two optical prisms or wedges cause the bar image to appear upon the screen as separated bar portions.

The two separated portions of the bar image are caused to be moved toward each other by manipulating the objective lens until the one-half of the picture appearing above the horizontal division line as transmitted by one of the optical prisms is positioned in alignment with the lower half of the picture, which lower half is the portion of the view projected through the other optical prism. When the bar portions are brought into alignment the focusing procedure is complete.

The use of prisms for a split image focusing is found in range finder devices for photographic cameras; however, in these range finder devices the prisms are in fixed relation to a camera frame and are maintained in the view finder system in an immovable condition. Whereas, in the projective range finder focusing device herein disclosed, the focusing device is carried by the slide changer apparatus either as an attached member or as a slide removable in said slide changer apparatus. In either arrangement the focusing device is brought in way of the illuminated optical path during the "focusing" of the projector and the focusing device is absent from the optical path during the periods of projecting the image of other slides.

It is an object of this invention to provide a range finder focusing device including an optical light-conducting member having a pair of oppositely sloped optical prism member portions whose theoretic intersection line is disposed in parallel relation to a mask member having D-shaped apertures. There is a bar mask portion between the apertures and when the device is in the illuminated optical path the bar portion is opposite the prism members. This range finder focusing device in combination with a slide changer apparatus is movable in the illuminated optical path of a slide projector system and movable therefrom after the optical system has been brought into sharp focus by moving the objective lens to bring the split image of the projected bar portions into coincidence.

It is a further object of this invention to provide a range finder or split-image focusing device having a planar surface portion disposed to be moved into a determined relation to the automatic focusing system of an optical system of a slide projector. This range finder or split-image focusing device is movable into and from the illuminated optical path at the discretion of the projector operator.

INTENT OF THE DISCLOSURE

Although the following disclosure offered for public dissemination is detailed to insure adequacy and aid in understanding of the invention, this is not intended to prejudice that purpose of a patent which is to cover each new invention concept therein no matter how it may later be disguised by variations in form or additions of further improvements. The claims at the end hereof are intended as the chief aid toward this purpose, as it is these that meet the requirement of pointing out the parts, improvements or combinations in which the inventive concept is found.

There has been chosen a specific embodiment of the range finder focusing device and a modification thereof as adopted for use in an automatic slide projector and showing a preferred means in which this device is attached to a slide changer apparatus or as an alternate focusing device as a range finder focusing slide. This specific embodiment and modification thereof has been chosen for the purpose of illustration and description as shown in the accompanying drawings wherein:

BRIEF DESCRIPTION OF THE DRAWINGS

FIG. 1 represents an isometric view of a slide projector apparatus having a changer and which the range finder focusing device of this invention may be typically mounted.

FIG. 5 represents a sectional view on the line 5—5 of FIGS. 2 and 6 and showing the relationship of the prisms provided on one side of the range finder focusing device and with a mask member mounted on the opposite side of the device;

FIG. 6 represents a back or rear view of the range finder focusing device of FIG. 5 the view being taken on the line 6—6 of FIG. 5;

FIG. 7 represents a partly diagrammatic end view of the slide changer and showing particularly the range finder focusing device as mounted on the pusher bar, the view looking in the direction of the arrows 7—7 of FIG. 4;

FIG. 8 represents a partly diagrammatic sectional view of the slide changer, the view taken on the line 8—8 of FIG. 4 and showing in particular the slide return pusher member mounted on the pusher bar;

FIG. 9 represents a view of the image as projected through the range finder focusing device and indicating an out-of-focus condition as viewed upon a screen;

FIG. 10 represents a view of the image as projected through the range finder focusing device when the object lens of the projector has been moved to an in-focus condition;

FIG. 11 represents a front view of an alternate embodiment in the form of a slide member which is adapted for removable movement into and out of a slide changer mechanism of a projector to provide a range finder focusing means when the slide member is moved into the projector optical path;

FIG. 12 represents a sectional view as taken on the line 12—12 of FIG. 11 and showing a preferred construction of the slide;

FIG. 13 represents a face or front view of a metal mask as mounted on the front face of the slide of FIG. 11;

FIG. 14 represents a side view taken on the line 14—14 on the mask of FIG. 13.

In the following description and in the claims various details will be identified by specific names for convenience. These names, however, are intended to be generic in their application. Corresponding reference characters refer to like members throughout the several figures of the drawings.

The drawings accompanying, and forming a part of, this specification disclose certain details of construction for the purpose of explanation of the broader aspects of the invention, but it should be understood that structural details may be modified in various respects without departure from the concept and principles of the invention and that the invention may be incorporated in other structural forms than shown.

DESCRIPTION OF THE PREFERRED EMBODIMENT

Referring now particularly to FIG. 1, there is shown a projector 20 which is contemplated to be of the automatic focusing type or style. In this projector an objective lens 22 is disposed to be automatically moved in response to a light-responsive device which "reads" a planar surface of the slide as it is moved into the optical path of the projector. In all slide projectors it is desirable that the plane of the transparency or film of successive slides be in the same position in the focal system relative to the objective lens in order that the slides, as they are moved into the optical path, are automatically in focus as viewed upon the screen. The projector 20 may have automatic slide feeding or may have a button or switches 24 for actuation of a slide-changing apparatus. In addition it is contemplated that the slide changer may be manually manipulated as desired. All of these slide manipulating arrangements are conventional and are merely a matter of design and/or selection.

Figure 2:
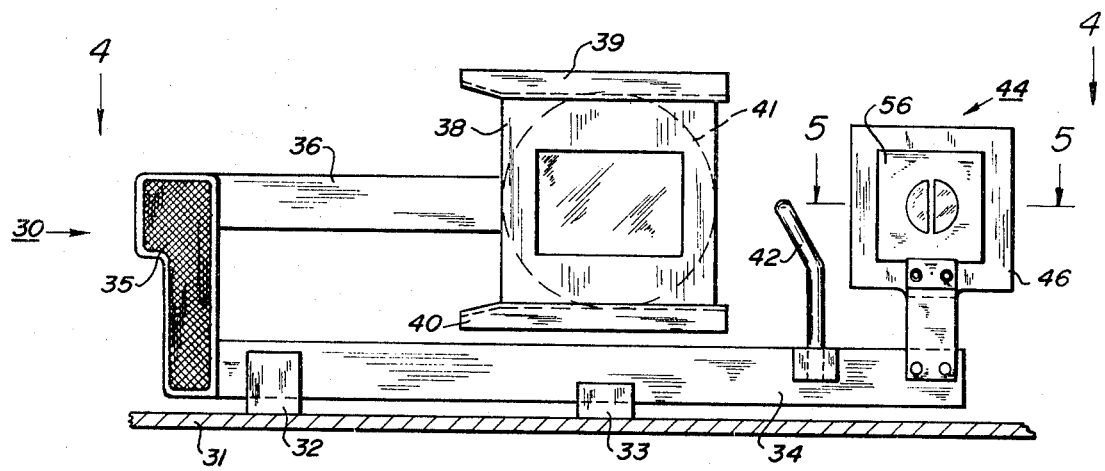
FIG. 2 represents a side view of a slide changer mechanism as used in an automatic focus projector and showing a slide positioned in the optical path or axis of the projector.

Referring to FIG. 2, there is shown a slide pusher 30 carried on a projector base member 31 and reciprocable in guides 32 and 33. A bottom beam member 34 portion of pusher 30 is sized to slide in these guides. Extending from a grip portion 35 of the slide pusher 30 is a slide-engaging finger 36 disposed to engage the left-hand side of a slide 38. In this FIG. 2 the slide 38 is in its viewing position in the optical path of the projector. The slide has its upper and lower edges engaged and maintained in guides 39 and 40 which are carried by the frame of the projector by supports not shown. When the slide is in said viewing position, the slide 38 is centered with the optical axis as represented by the condensing lens 41 as shown in phantom outline in FIG. 2.

Figure 4:
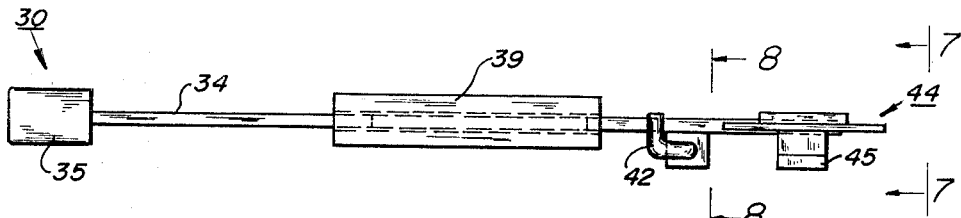
FIG. 4 represents a top view of the slide changer of and in the position of FIG. 2, the view being taken on the line 4—4 of FIG. 2.
Figure 3:
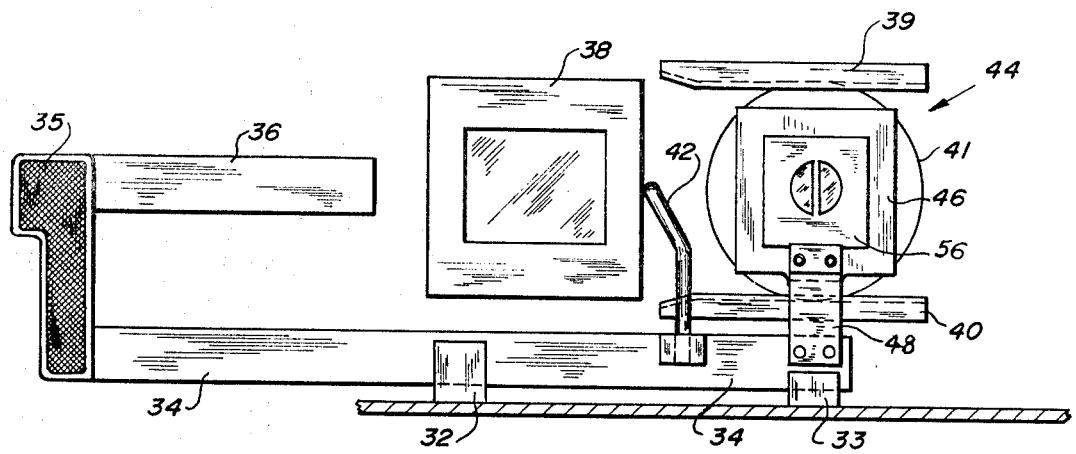
FIG. 3 represents the side view of the slide changer of FIG. 2 but with the slide removed from the optical axis and with the range finder focusing device of this invention now positioned in the optical axis of the projector.

Referring next to FIGS. 3, 4 and 8, it is to be noted that the slide 38 has been pushed from the guides 39 and 40 by means of a finger 42 disposed to engage the right-hand edge of the slide 38 as the pusher 30 is moved leftward. With this leftward motion the slide is moved or pushed into a tray or the like. This tray is not shown in the drawings as slide trays are not considered a part of this invention and are entirely conventional. As the slide is moved from the optical axis of FIG. 2 to the tray retaining position of FIG. 3, there is moved into the optical axis a range finder focusing device generally indicated as 44. This range finder focusing device includes a prism member 45 having a pair of prisms in which the slopes are disposed one hundred and eighty degrees from each other as hereinafter more fully described. These prisms are contemplated as being molded into the prism member. This prism member may be integral with a frame member 46 preferably made of an optical plastic. Attached to the face of the focusing device is a front mask to be hereinafter more fully described.

Referring to FIG. 7, it is noted that the range finder focusing device is attached to and is carried by a support 48 which is mounted on the bar 34 by rivets. As fixedly attached, the focusing device 44 is movable with the bar 34 and is maintained in a precise plane within the projector by means of the precise retention and movement of the bar 34 in guides 32 and 33.

Referring now to FIGS. 5, 6 and 12, the prism frame member 46 is preferably a single molded unit which includes a reinforcing ring 50 providing a support and guard for right and left sloped prism portions 51 and 52. These prism portions have surfaces which are shown as disposed at an angle of twenty to twenty-five degrees to the face 54 of the prism frame member 46. The prism portions 51 and 52 are contiguous at a horizontal imaginary plane 55 and the angularly disposed surfaces pass through an imaginary line which will intersect the optical axis of the projector in one position of the pusher 30 on which the frame member 46 is mounted.

The face of the molded frame member 46 has a metal mask 56 attached thereto. The configuration of the mask is more clearly seen in FIGS. 2, 3, 11 and 13. This metal mask is proposed to be of copper or alloys thereof and is preferably of a thickness of two or three thousandths of an inch. As shown, the mask is square in configuration and has a pair of D-shaped openings 59 and 60. These openings are formed with the straight edge portions disposed in a parallel spaced vertical alignment to provide a bar portion 62 between the two D-shaped openings. The bar 62 is disposed to intersect the optical axis of the illuminated projecting path of the projector.

USE AND OPERATION

The range finder focusing device of FIGS. 1 through 10 contemplates that prior to the insertion of slides into the illuminated projection path of the projector that the slide changer is positioned so that the range finder focusing device 44 is in the optical path as in FIG. 3. A shutter or shield, not shown, is conventionally carried in the projector and is automatically moved in way of the illuminated optical path when the slide changer is in the position of FIG. 3. This shutter usually is between the slide changer and objective lens; however, positioning of this shutter is merely a matter of manufacturing design as its function is to block the passing of light along the optical path.

With the range finder focusing device 44 moved into the position shown in FIG. 3, it is assumed that the focusing lens 22 has not, as yet, been brought into the desired focus. The operator of the projector actuates a switch or lever, not shown, to move the shutter from the optical path, whereupon an image similar to that shown in FIG. 9 may be projected upon the screen or viewing surface. The prism portions 51 and 52, when not precisely in the focal plane, cause the projected image of bar 62 to be split into bar portions 70 and 72 as in FIG. 9. Depending upon the position of the prisms in relation to the objective lens, the bar portions may be either to the right or left of the optical axis. The objective lens 22 is moved to bring the bar portions 70 and 72 into the alignment as shown in FIG. 10, whereupon the focus of the projector is considered to be "sharp" or exact. The projector is contemplated as having an automatic focusing device which is responsive to the plane of mask 56, the focusing process just performed is also "sharp" or exact for the transparency or film within the frame of the slide 38.

Figure 15:
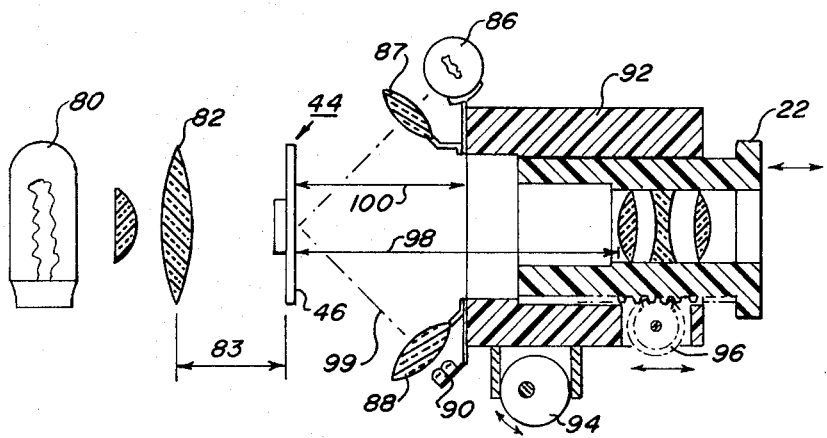
FIG. 15 represents a somewhat diagrammatic view of the optical arrangement of an automatic focusing system and showing a range finder focusing device placed in its optical path.

Referring particularly to FIG. 15, a diagrammatic representation of the actuation of the focusing device shows a lamp 80 providing the illumination for the optical path. A condensing lens 82 is disposed at a selected distance 83 from the face 46 of the range finder focusing device 44. An automatic focusing device including a lamp 86, lens 87, lens 88 and photosensor 90 is carried by a support 92. This support is moved along the optical axis by means of an eccentric drive 94 which is actuated in response to light deviations received by photosensor 90. Each automatic focusing device establishes the distance 100 for the particular projector it is mounted in. The objective lens system 22 is movable in support 92 by means of a rack and pinion drive 96 which is used by the operator to precisely focus the objective lens for the particular distance to a viewing screen.

The distance 98 is the adjusted distance from the objective lens to the range finder focusing device 44. Once this distance is established, it is kept constant to maintain an exact focus to an established viewing surface or screen. The movement of a slide into the position of the focusing device 44 may encounter buckling or popping of the slide, whereupon distance 98 is changed. This out-of-position condition is discerned by the reflected light 99 which is "read" by photosensors 90 and in response thereto eccentric 94 is actuated to move support 92 to bring distance 100 to its established distance. After the automatic focusing is completed, distance 98 should again be at the exact distance established during the precise focusing on the range finder focusing device.

When the slide 38 is moved into the position of FIG. 2, the slide is brought into the illuminated optical axis of a "focused" projector, the resulting picture upon the screen is then in "focus." If at any time during the operation of the projector the picture seems to be out of focus, it is merely a matter of moving slide 38 out of the optical axis and into the non-projecting position of FIG. 3. With the focusing target device now in the optical axis, the shutter is moved from in way of the range finder focusing device and the projected view of FIG. 10 is then checked to ascertain the alignment of the bar portions 70 and 72 upon the screen. If, for any reason, the projector has had its objective lens moved from its prior precise focusing position, it is refocused by moving the objective lens assembly 22 by means of rack and pinion 96 to again bring the lines 70 and 72 into coincidence, as in FIG. 10.

REMOVABLE RANGE FINDER FOCUSING DEVICE OF FIGS. 11 THROUGH 14

In the embodiment above-shown and described, the range finder focusing device 44 is attached to the beam 34 and as particularly seen in FIG. 7 is in a predetermined alignment with beam 34. In this preferred installation, the target device is always precisely positioned for checking the focus of the projector. It is contemplated that other automatic focusing projectors may use a removable range finder focusing device. Accordingly, for use with these projectors, a focusing slide is shown in FIGS. 11 through 14.

In these projectors there is no attempt to use a retaining bar 34 upon which the focusing device 44 may be fixedly mounted. Instead, a removable focusing device in the manner of a slide is provided. The slide of FIGS. 11 and 12 is placed in a slide changing device of the projector and the slide is moved into the optical path of the projector. The objective lens on the projector is then caused to be moved to bring the bar portions 70 and 72 into the coincidence of FIG. 9. After adjusting the objective lens of the projector, the changer is actuated to move the slide from the illuminated optical path and removed from the projector or the slide may be stored with a series of slides such as would be stored in a tray device.

The frame 74 of this slide is shown as of the size of the slide used for a projector, as for example, two inches by two inches. The prism portion 76 (FIG. 12) is molded integral with the frame. The mask 56 is attached to the face of the frame such as by gluing, riveting or the like. It is only necessary that the mask provide a precise plane of the bar 62 and that the D-shaped openings provide a light path sufficient to outline the bar portions 70 and 72.

It is noted that whether the focusing device is used with the automatic focusing projector of FIGS. 1 through 10 or as a slide in an automatic focusing projector, it is contemplated that the support 92 is movable in response to a deviation of the reflected light 99. No matter the position of the slide 44 in the illuminated optical axis, the distance 100 is maintained and the distance 98 is also supposedly in its adjusted position. The "focus" can be readily checked by moving the focusing device 44 into the illuminated optical path. Readjustment, if necessary, is by moving objective lens 22. If, after bringing the projector to "sharp" focus as in FIG. 10, the slide is out of focus, the fault is with the slide.

Although the above description discloses a rectangular focusing device 44, it is, of course, readily noted that any shape sufficient to engage the illuminated optical path may be used. It is also noted that D-shaped openings 59 and 60 are a matter of selection as it is only necessary that a bar 62 be formed with a light passing opening provided on each side of the bar. The orienting of the bar as to the vertical axis of the projector is also a matter of selection.

The prisms are shown as having slopes of about twenty or twenty-five degrees to the face of the prism frame member. This angle, of course, can be less than and more than this preferred angle. As a practical matter, an angle of ten degrees is about the low limit and an angle of about thirty-five degrees is about the upper limit.

Terms such as "left," "right," "up," "down," "bottom," "top," "front," "back," "in," "out," and the like are applicable to the embodiments shown and described in conjunction with the drawings. These terms, as used, are merely for the purposes of description and do not necessarily apply to the position in which the range finder focusing device may be used in a projector or may be constructed or used.

The conception of the range finder focusing device and its application in an automatic slide projector is not limited to the specific embodiments shown but departures therefrom may be made without sacrificing its chief advantages and protection is sought to the broadest extent the prior art allows.

What is claimed is:

1. A focusing device for use in automatic slide projectors wherein at least a portion of the lens system including the objective lens of the projector is movable by automatic focusing mechanism to bring the lens system to a preselected position from a slide, said focusing device and like members being movable into the illuminated optical axis of the projector, the objective lens of the lens system being independently movable to a position whereat the projected image is viewed as in sharp focus on a screen and the like, said focusing device including: (a) a light-conducting member having a planar surface on one side thereof; (b) a pair of light-conducting prism portions in contiguous relationship to each other and disposed opposite the planar surface of the light-conducting member; (c) a mask member contiguous to the planar surface, said mask providing means for obstructing the passage of light except through at least a pair of openings formed therein, said openings shaped so that a bar mask portion is provided between the formed openings, the bar portion disposed at substantially right angles to a plane defining the contiguous relationship of the prisms to each other, and (d) a support frame disposed to carry said prism portions, a light-conducting member and a mask to provide an assembled focusing device adapted for movement into an illuminated optical axis of the projector whereupon the objective lens is movable to bring the lens system into a condition to project upon a screen a sharp focused image and in which, in an out-of-focus condition, the bar portion of the mask may appear as displaced bar members, and by moving the objective lens said bar portions are brought into coincidence to indicate a sharp in-focus condition, and the planar surface of the light-conducting member is readable by the automatic focusing mechanism to move and maintain the lens system at its preselected position while the objective lens is moved as desired by an operator.

2. A focusing device for use in automatic slide projectors as in claim 1 in which the light-conducting member and light-conducting prism portions are made as a single molded plastic unit.

3. A focusing device for use in automatic slide projectors as in claim 2 in which the focusing device is fastened to and is movable with a bottom beam member of a slide pusher member of a slide changer mechanism carried by the slide projector.

4. A focusing device for use in automatic slide projectors as in claim 3 in which the prism portions of the device include a reinforcing rim portion intergral therewith and providing a support and guard for the oppositely sloped prism portions.

5. A focusing device for use in automatic slide projectors as in claim 4 in which the rim portion is a ring.

6. A focusing device for use in automatic slide projectors as in claim 1 in which the openings in the mask are two in number, each opening being D-shaped in configuration and arranged as mirror images of each other and with the arcuate portions of the openings disposed away from each other.

7. A focusing device for use in automatic slide projectors as in claim 6 in which the plane defining the relationship of the prisms to each other is positioned in the device so that when the device is moved into the optical axis of the projector said plane intersects the optical axis.

8. A focusing device for use in automatic slide projectors as in claim 7 in which the bar portion of the device is positioned so that when the device is moved into the optical axis of the projector, said bar intersects the optical axis.

9. A focusing device for use in automatic slide projectors as in claim 1 in which the slope of the prisms is at an angle which is not less than ten degrees and is not more than forty degrees included angle to the planar surface.

10. A focusing device for use in automatic slide projectors as in claim 1 in which the mask is made from metal sheet of about two to five thousandths of an inch in thickness.

11. A focusing device for use in automatic slide projectors as in claim 10 in which the metal is more than half copper.

12. A focusing device for use in automatic slide projectors as in claim 1 in which the automatic focusing apparatus includes a separate light source and a photosensor and a light path system disposed to conduct the light from the source and reflect said light from the surface of a slide, focusing device and the like, said reflected light conducted from the surface to the photosensor to actuate the automatic focusing apparatus when necessary.

13. A focusing device for use in automatic slide projectors as in claim 1 in which the focusing device is an assembled unit completely removable from the projector and in which the support frame has its length and width sized and configured to conform to the length and width of a slide as used in said projector, said focusing device disposed to be moved into and out of a slide changing mechanism of the projector and while in the slide changing mechanism the focusing device is movable into the illuminated optical axis of the projector.

14. A focusing device for use in automatic slide projectors as in claim 13 in which the light-conducting member and light-conducting prism portions are made as a single molded plastic unit.

15. A focusing device for use in automatic slide projectors as in claim 14 in which the prism portions of the device include a reinforcing rim portion integral therewith and in which the position of the plane defining the relationships of the prisms to each other and in which the bar portion of the device is positioned on the device so that when the device is moved into the optical axis said plane and bar intersect said optical axis.

References Cited

UNITED STATES PATENTS 2,811,078  10/1957  Engelhard et al. _____ 353—97

OTHER REFERENCES

Focussing with Crossed Prisms, Amateur Photographer, Apr. 10, 1946, pp. 243 and 245.

SAMUEL S. MATTHEWS, Primary Examiner

U.S. Cl. X.R.

353—81, 101